United States Patent [19]

Kunz

[11] Patent Number: 4,858,711
[45] Date of Patent: Aug. 22, 1989

[54] ELECTRONIC BALANCE

[75] Inventor: Peter Kunz, Gossau, Switzerland

[73] Assignee: Mettler Instrumente AG, Switzerland

[21] Appl. No.: 285,772

[22] Filed: Dec. 16, 1988

[30] Foreign Application Priority Data

Feb. 15, 1988 [CH] Switzerland .......................... 552/00

[51] Int. Cl.$^4$ .................... G01G 7/00; G01G 21/28
[52] U.S. Cl. ................................. 177/212; 177/243
[58] Field of Search ................... 177/212, 180, 243

[56] References Cited

U.S. PATENT DOCUMENTS

| | | | |
|---|---|---|---|
| 4,401,176 | 8/1983 | Knothe et al. | 177/180 |
| 4,465,152 | 8/1984 | Schmitter | 177/180 |
| 4,548,288 | 10/1985 | Komoto | 177/243 X |
| 4,664,207 | 5/1987 | Knothe et al. | 177/181 |
| 4,666,005 | 5/1987 | Komoto et al. | 177/180 |
| 4,762,190 | 8/1988 | Meixner | 177/181 |
| 4,789,034 | 12/1988 | Luchinger et al. | 177/181 |
| 4,798,250 | 1/1989 | Knothe et al. | 177/181 |

FOREIGN PATENT DOCUMENTS 2356918 6/1976 France ................................. 177/212
2176302 12/1986 United Kingdom ................ 177/212

Primary Examiner—George H. Miller, Jr.
Attorney, Agent, or Firm—Toren, McGeady & Associates

[57] ABSTRACT

An electronic balance includes a measuring cell for electromagnetic load compensation. The measuring cell and a load receiving member of the balance are arranged in an inner housing which is closed to all sides with the exception of an opening for a receiving cone of the load receiving member. The inner housing is mounted in the balance housing so as to be spaced apart from the walls, the base and the cover of the balance housing. A circumferentially extending partition wall is tightly sealingly attached to the bottom and the cover of the balance housing. The partition wall is mounted between the inner housing and the walls of the balance housing.

5 Claims, 1 Drawing Sheet

ELECTRONIC BALANCE

BACKGROUND OF THE INVENTION

1. Field of the Invention

The present invention relates to an electronic balance including a balance housing and a measuring cell for electromagnetic load compensation. The measuring cell is placed in the balance housing and is separated by means of a partition from the electric circuits of the electronic analyzing and indicating means. The balance further includes a load receiving member with a receiving cone for the weighing dish extending through an opening in the balance housing. The balance also includes control elements.

2. Description of the Prior Art

In high-resolution balances, even small air movements within the balance influence the measurement results. The reasons of such air movements within the balance housing are the different pattern of heating of the individual electric and mechanical components and the influence of heat radiation acting on only one side from the inside and from the outside, as well as cold air flows as they occur during winter when the windows are open. The different heating or cooling of the individual balance components not only results in air movements, but it also results, due to different longitudinal expansions of individual components, for example, in a change of the length of the levers and, thus, in a change of the transmission ratios of the forces to be transferred and transmitted by the levers.

A balance of the above-described type is known from Swiss Pat. No. 638,894 corresponding to U.S. Pat. No. 4,280,577. The Swiss patent proposes in the above-described type of balance to make individual components hollow, for example, the coupling member of the load receiving member, and to accommodate the elastic bearing in the hollow component, in order to obtain a uniform expansion of these two components as a result of a uniform temperature pattern.

The Swiss patent proposes as another feature to separate with respect to space the measuring cell and the electronic analyzing and indicating circuitry by means of a partition.

By means of this partition, it is possible to improve the temperature-related behavior of the balance and, thus, to achieve a more uniform longitudinal expansion of some of the mechanical components. However, air movements which negatively influence the weighing result and are caused by non-uniform heating cannot be avoided by the measures proposed by the Swiss patent to such an extent that the consequences of the air movements could be eliminated in high-resolution balances. Air will always penetrate through the gaps between the lower portion and the upper portion of the housing to such an extent that an air flow is generated which escapes especially through the gap surrounding the receiving cone for the weighing dish.

It is, therefore, the primary object of the present invention to provide an electronic balance in which the above-described disadvantages are avoided.

Specifically, it is the object of the present invention to provide an analytical balance in which a uniform pattern of heating of the sensitive balance components prevents the formation of air flow and of non-uniform expansion of mechanical components.

SUMMARY OF THE INVENTION

In accordance with the present invention, the measuring cell for the electromagnetic load compensation and the load receiving means are arranged in another inner housing which is closed to all sides. The inner housing has an opening for the receiving cone. The inner housing is placed in the balance housing spaced on all sides apart from the walls, the base and the cover of the balance housing. A circumferentially extending partition tightly sealingly attached to the base and the cover of the balance housing is mounted between the inner housing and the walls of the balance housing.

The complete encapsulation of the electronic system of the balance as well as of the mechanical elements in a common housing and an additional separation with respect to space of the input and output units, makes it possible in an advantageous manner to protect these components from heat radiation acting on the outside and additionally to prevent the flow of air. Furthermore, the intermediate spaces formed by the separating walls result in a uniform heat distribution in and around the measuring cell. The homogenous temperature pattern within and outside of the measuring cell prevents differing temperature patterns within the balance and, thus, prevents the generation of air movements.

The inner housing surrounding the measuring cell additionally serves as a supporting element and, due to its small dimensions as compared to the size of the balance housing, has a great stiffness. Moreover, the multiple encapsulation of the sensitive electronic measuring and computing elements results in an excellent protection against interferences from magnetic fields and radio waves of high and very high frequency.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

The single FIGURE of the drawing is a schematic cross-sectional view of an electronic balance according to the invention.

DETAILED DESCRIPTION OF THE INVENTION

Figure 1:
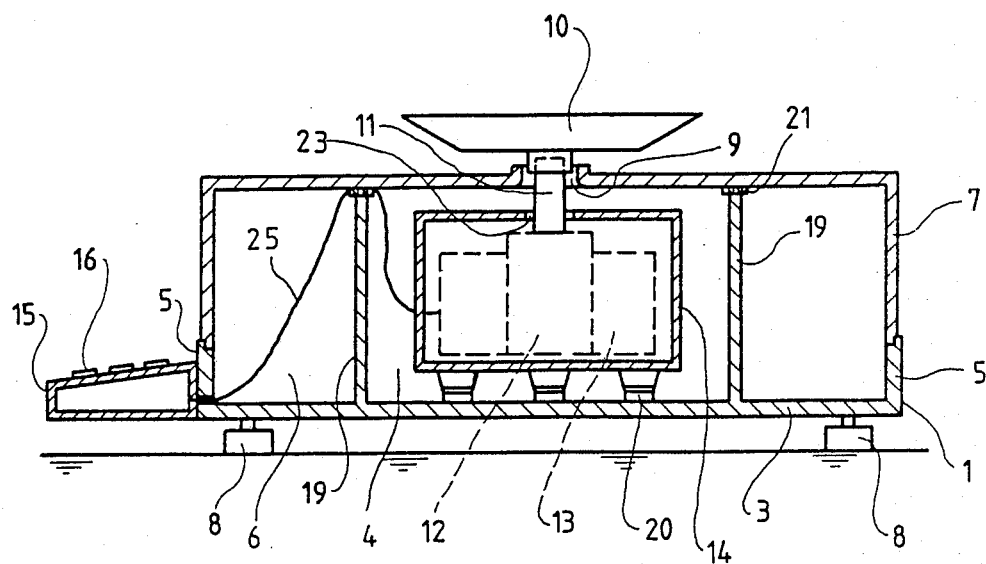

As illustrated in the drawing, a balance housing 1 of light metal has a base 3, walls 5 and a cover 7 as well as three legs 8. The cover 7 has at the top thereof an opening 9 for placing the weighing dish 10 on a pin 11 mounted at the upper end of the load receiving member 12. The load receiving member 12 is mounted at an only schematically illustrated device for the electromagnetic load compensation or measuring cell 13.

A control unit 15 with keys 16 and indicating elements as well as, if necessary, an electronic analyzing unit, are arranged at the front wall 5. The control unit 15 may be mounted independently of the housing 1 or may be connected to housing 1.

The interior of housing 1 is divided by means of walls 19 into two chambers, i.e., central chamber 4 and a chamber 6 which completely surrounds and is arranged next to chamber 4. The walls 19 may be seamlessly connected to the base 3 and support at the top thereof a sealing ledge 21 which is in contact with the cover 7.

Measuring cell 13 is placed in a housing 14 which completely surrounds measuring cell 13. Housing 14 is placed in chamber 4 on one or more legs 20 preferably thermally insulated. The walls of housing 14 are spaced apart from the surrounding walls 19 and from the cover 7.

Housing 14 has an opening 23 for the pin 11 of load receiving member 12.

Electric cables 25 which connect the measuring cell 13 with the control units are conducted through stuffing-box seals or are conducted in another manner which prevents air from penetrating from one housing component to another housing component.

The balance housing 1 as well as the housing 14 of the measuring cell 13 preferably have great wall thicknesses in relation to their size, so that an optimum heat conduction and, thus, a uniform heat distribution can occur over the entire surfaces of the housings.

While a specific embodiment of the invention has been shown and described in detail to illustrate the application of the inventive principles, it will be understood that the invention may be embodied otherwise without departing from such principles.

I claim:

1. In an electronic balance including a balance housing having walls, a base and a cover, a measuring cell for electromagnetic load compensation placed in the balance housing, and electronic analyzing and indicating means including electric circuits, partition means for separating the measuring cell from the circuits of the electronic analyzing and indicating means, the balance further including a load receiving member with a receiving cone for a weighing dish, the receiving cone extending through an opening in the balance housing, and control elements for operating the balance, wherein the improvement comprises that the partition means comprises an inner housing, the measuring cell for electromagnetic load compensation and the load receiving means being arranged in the inner housing, the inner housing being closed to all sides and having an opening for the receiving cone, the inner housing being placed in the balance housing so as to be spaced on all sides from the walls, the base and the cover of the balance housing, and a circumferentially extending partition wall tightly sealingly attached to the bottom and the cover of the balance housing, the partition wall being mounted between the inner housing and the walls of the balance housing.

2. The electronic balance according to claim 1, comprising at least one leg for supporting the measuring cell at a distance from the bottom of the balance housing.

3. The electronic balance according to claim 2, wherein the at least one leg is of a thermally poorly conductive material.

4. The electronic balance according to claim 1, wherein the control elements and the electronic analyzing means are arranged outside of the balance housing.

5. The electronic balance according to claim 1, wherein the inner housing surrounding the measuring cell is an element which supports the mechanical components of the balance.

* * * * *